Nov. 1, 1966          O. CARRUTH          3,283,191

INDUCTOR ALTERNATOR

Filed Nov. 7, 1962

INVENTOR
OTIS CARRUTH

BY *Rupert J. Brady*

ATTORNEY

United States Patent Office 3,283,191
Patented Nov. 1, 1966

3,283,191
INDUCTOR ALTERNATOR
Otis Carruth, 110 N. Austin St., Tulia, Tex.
Filed Nov. 7, 1962, Ser. No. 236,007
8 Claims. (Cl. 310—168)

This invention relates broadly to alternators of the automotive type and more particularly to a new and improved construction of alternator and a new and improved construction of alternator rotor therefor.

One of the objects of the present invention is to provide a construction of alternator which will produce greater three-phase A.-C. current for the size of the rotor utilized in comparison to existing alternators on the commercial market.

Another object of the present invention is to provide an improved construction of alternator rotor which eliminates the necessity of collector rings and rotating field coils in three-phase automotive type alternators.

Still another object of the invention is to provide an automotive type alternator which is simple in construction, economical to manufacture and easily adaptable to present-day mass production techniques.

Another object of the invention is to provide a construction of rotor for automotive type alternators which eliminates the use of costly permanent magnets.

Other and further objects of the invention reside in the arrangement of the magnetic flux path within the alternator and the elimination of the necessity of applying D.-C. field excitation of one specific polarity, as set forth more fully in the specification hereinafter following by reference to the accompanying drawings, in which.

Figure 1:
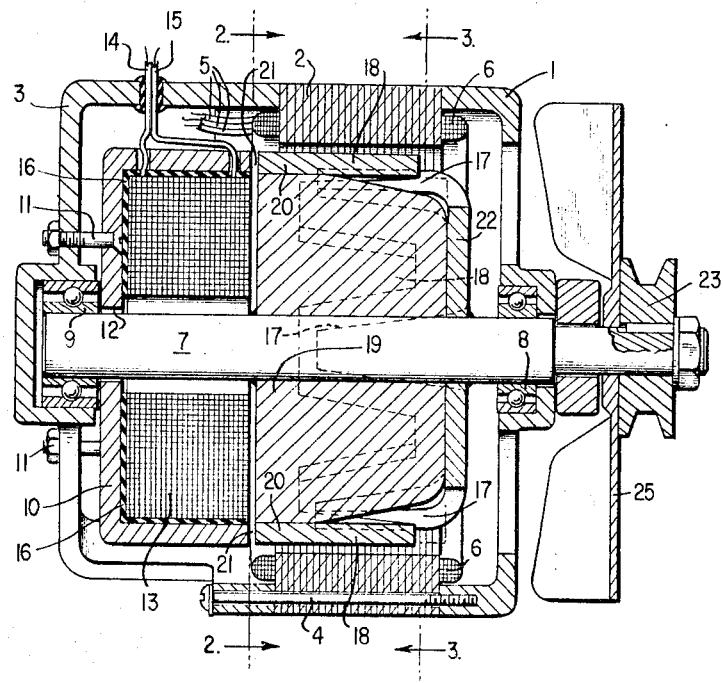
FIG. 1 is a longitudinal sectional view through the alternator of the invention.

In the drawings, wherein, for the purpose of illustration, is shown a preferred embodiment of the invention, similar reference characters have been used throughout to designate corresponding parts. Referring to the drawings in greater detail the alternator housing is comprised of forward casing 1, laminated stator core portion 2 and rear casing portion 3 joined together in conventional manner by means of casing bolts 4, or the like. The laminated stator core portion 2 is of conventional design, consisting of a plurality of annular laminae providing a plurality of stator slots about their inner perimeter in which three stator coils 6 connected in Y are wound, in conventional manner, so as to present three stator output conductors indicated at 5. In the preferred form of the invention the laminated stator core portion 2 is a 36-slot stator having the three stator coils 6 wound therein. In order to prevent short circuiting of the magnetic flux path within the alternator, forward casing 1 and rear casing portion 3 are constructed of aluminum or other non-magnetic material.

A rotor shaft 7, constructed of iron or other paramagnetic material, is journaled for rotation within the alternator housing through bearings 8 and 9 respectively carried by forward casing 1 and rear casing portion 3. A stationary cup member 10, constructed of iron or other magnetic material, is rigidly secured to rear casing portion 3 by means of bolts 11, or other suitable securing means, and is provided with a central aperture 12 such that cup member 10 may be disposed about rotor shaft 7 which extends through central aperture 12 in rotative relation, as shown in FIG. 1. Cup member 10 is disposed opening toward forward casing 1 and a coil 13 adapted to be connected across a source of D.-C. potential through conductors 14 and 15 is press-fitted into the cup member or secured therein by other suitable means, such as to be disposed in surrounding spaced relation to rotor shaft 7. Coil 13 is suitably insulated from cup member 10 as shown at 16 and the cup member and rear casing portion 3 are provided with suitable access openings for coil exciter conductors 14 and 15 as shown in FIG. 1. Coil 13 serves as the field winding for the alternator of the invention and the D.-C. potential applied across conductors 14 and 15 may be of either polarity thus simplifying the installation of the alternator. Coil 13 is disposed in spaced relation with rotor shaft 7 and in the preferred form of the invention the rotor shaft has a rather large diameter of approximately two inches, with the large diameter portion of the shaft extending at least in the area of the rotor, to be described, and through coil 13 and cup member 10.

Figure 2:
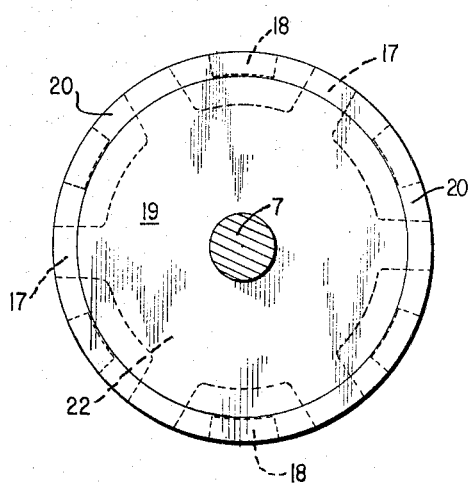
FIG. 2 is a cross-sectional view, partly in elevation, taken substantially along lines 2—2 of FIG. 1 and with parts omitted showing one end of the improved alternator rotor.
Figure 3:
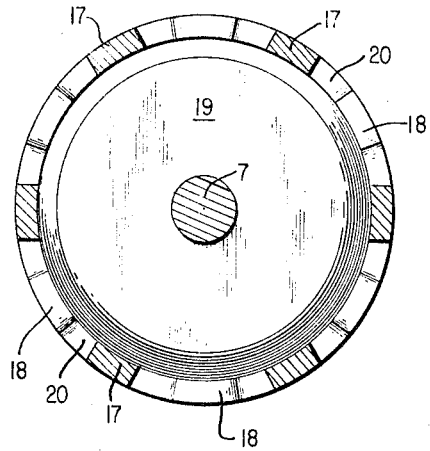
FIG. 3 is a cross-sectional view through the opposite end of the alternator rotor taken substantially along line 3—3 of FIG. 1.

The improved alternator rotor shown in FIGS. 1, 2 and 3 is provided with two groups of intermeshing pole shoes 17 and 18 disposed in spaced relation relative to each other. A substantially cylindrical block 19 of non-magnetic material, such as aluminum, brass, or the like, is rigidly connected to rotor shaft 7 by welding, keying, press-fit or other suitable securing means, with one end thereof disposed in spaced relation with one end of coil 13 with sufficient clearance therebetween so that cylindrical block 19 is free to rotate relative thereto. Although the cylindrical block 19 in the drawing has been shown somewhat tapered at one end, it is to be understood that the block may also be in the form of a flat cylindrical disc. A ring or sleeve 20 of paramagnetic material, such as soft iron, integrally carrying the group of pole shoes 18 thereon is rigidly connected about the perimeter of cylindrical block 19 such that the end of sleeve 20 opposite the pole shoes 18 is disposed in alignment with and adjacent the edge of cup member 10, so as to form a magnetic air gap 21 between the edges of sleeve 20 and cup 10. The sleeve 20 is connected to cylindrical block 19 by shrinking the sleeve onto the block while the sleeve is heated and then securing the members rigidly together by means of dowel pins or the like. However, these members can be connected in many other ways, such as by keying, riveting, etc., and the mode of connection described is intended only for illustrating one manner in which the members can be joined.

The group of pole shoes 17 are integrally carried by end member 22, with the shoes 17 and end member 22 being constructed of a paramagnetic material such as soft iron. End member 22 is rigidly secured to rotor shaft 7 in the same manner as cylindrical block 19, or by any convenient connecting means, and the pole shoes 17 are disposed at substantially right angles thereto and in overlying relation with the edge perimeter of cylindrical block 19, in substantially the same cylindrical plane as pole shoes 18. In the preferred form of the invention six pole shoes 18 are provided on sleeve 20 and six pole shoes 17 are provided on end member 22 with each pole shoe being inwardly tapered toward the free end thereof. The respective pole shoes are disposed equidistant from each other and in intermeshing relation, with the pole shoes 17 and 18 forming magnetic poles of opposite polarity to thus provide a twelve pole alternator as disclosed in the preferred form of the invention. It is, however, to be understood that alternators having a different number of poles can be constructed according to the teachings of the invention.

It is therefore evident from the foregoing description that no costly permanent magnets are utilized in the rotor of the alternator of the invention and that troublesome and costly slip ring construction is completely eliminated from the design. The use of the non-magnetic rotor block 19 tends to magnetically insulate members 20 and 18 from shaft 7 and thus confine the lines of magnetic flux through the alternator to a desired set path. The entire alternator is rugged and simple in construction and capable of rendering many years of efficient use under adverse conditions of vibration, shock, etc., since there are relatively few parts which are subject to wear or which are susceptible to damage.

The outer end of rotor shaft 7 extending from forward casing 1 is provided with a pulley 23 for connection with a fan belt or the like for driving shaft 7 and the rotor thereon, and a finned fan wheel 25 or the like for maintaining a cooling air flow through the flow apertures provided in rear casing portion 3 and forward casing 1 for maintaining the alternator cool while in operating condition.

Generation of three-phase alternating current in stator coils 6 and providing this current on output conductors 5 is effected by rotation of the rotor member 7, 19, 20, 18, 17 and 22, while field coil 13 is simultaneously energized with a D.-C. voltage of any desired polarity. The magnitude of the three-phase A.-C. output of coils 6 is primarily dependent upon the amount of flux linking the groups of pole shoes 17 and 18 to stator core portion 2 and thus is dependent upon the magnitude of the direct current applied to field coil 13 since this current establishes the magnitude of the magnetic field in the alternator. When the alternator is connected into the electrical circuit of an automotive vehicle a voltage regulator is normally connected in series with field coil 13 for varying the amount of D.-C. current exciting the field coil. When coil 13 is energized the leakage flux therefrom sets up a flux path within the magetic members of the alternator to set up a magnetic circuit therethrough extending through rotor shaft 7 from the vicinity of coil 13 to end member 22, from end member 22 to the six pole shoes 17 carried thereby, from pole shoes 17 across the stator air gap through the adjacent poles on stator core portion 2, across the stator air gap to pole shoes 18, through sleeve 20 across magnetic air gap 21 to cup member 10 disposed in alignment therewith, and through cup member 10 across the air gap of central aperture 12 to rotor shaft 7, to thus complete the magnetic circuit. The machine has been found to work equally as well with D.-C. potentials of either polarity applied to conductors 14 and 15 of field coil 13 and when the alternator is connected into the electrical circuit of an automotive vehicle or the like, the A.-C. output on conductors 5 is fed to a full wave bridge rectifier circuit, in conventional manner, to convert the A.-C. current into D.-C. current, and from thence it is fed directly into the conventional electrical system. Since the electrical system with which the alternator of the invention is utilized is substantially of conventional type and well known in the art it is not deemed necessary to fully describe the connection of the alternator in such a circuit in the present specification.

The alternator of the invention has been constructed and successfully tested and has been found to be very efficient in operation and substantially maintenance-free. While the invention has been described in certain preferred embodiments, it is realized that modifications may be made and it is to be understood that no limitations upon the invention are intended other than those which may be imposed by the scope of the appended claims.

What I claim as new and desire to secure by Letters Patent of the United States, is as follows:

1. An alternator comprising a stationary member having a first magnetic core, output coil means positioned on said core, a rotatable shaft of magnetic material concentrically positioned within said stationary member and having two groups of axially extending intermeshingly spaced poles of magnetic material, paramagnetic means connecting one of said pole groups to said shaft, non-magnetic means connecting the other of said pole groups to said shaft, a second core of magnetic material connected on said stationary member about said shaft, a coil adapted to be energized by direct current power connected in said second core concentrically about said shaft to establish a closed flux path through said shaft, said paramagnetic means, said two groups of poles, said first magnetic core and said second core back to said shaft to produce alternating current in said output coil means upon rotation of said shaft.

2. An alternator as set forth in claim 1, including an annular sleeve of magnetic material connecting the interspaced poles of the other of said pole groups.

3. An alternator as set forth in claim 1, in which said second core is positioned in close spatial relation with one end of the other of said pole groups and in axial alignment therewith.

4. An alternator comprising a stationary member having a first magnetic core, output coil means positioned on said core, a shaft of paramagnetic material journaled for rotation on said stationary member and concentrically positioned therein, two groups of spaced axially extending intermeshed poles of magnetic material carried by said shaft in concentric relation to said first magnetic core, magnetic flux path completing means connecting one of said pole groups to said shaft, means connecting the other of said pole groups to said shaft to magnetically insulate the pole group from said shaft, a second core of paramagnetic material connected on said stationary member about said shaft, a coil adapted to be energized by direct current power positioned in said second core concentrically about said shaft to establish a flux path through said shaft, and flux path completing means, said two groups of poles and said fixed magnetic core and said second core back to said shaft, to produce alternating current in said output coil means upon rotation of said shaft.

5. An alternator as set forth in claim 4 in which said means comprises a substantially cylindrical member of non-magnetic material.

6. An alternator as set forth in claim 4, in which said means comprises a substantially cylindrical member of non-magnetic material and said two groups of poles are disposed on the perimeter surface thereof.

7. In an alternator rotor, a rotor shaft of paramagnetic material, an annular member of paramagnetic material disposed about said shaft in spaced relation, non-magnetic means connecting said annular member to said shaft, a plurality of spaced axially extending first pole shoes extending from said annular member, a plurality of opposed axially extending second pole shoes disposed in spaced intermeshing relation with said first pole shoes, and paramagnetic material means connecting said plurality of second pole shoes to said rotor shaft to provide an open rotor flux path from said shaft, through said paramagnetic material means, through said second and first pole shoes and terminating in said annular member.

8. An alternator rotor comprising, a rotor shaft, a substantially cylindrical member of non-magnetic material having end faces and a perimeter surface connected to said shaft, an annular sleeve of paramagnetic material connected to the perimeter surface of said cylindrical member adjacent one end face and providing a plurality of spaced first pole shoes extending therefrom in overlying relation to the perimeter surface of and toward the opposite end face of said cylindrical member, a plurality of opposed second pole shoes disposed in alignment with said first pole shoes in spaced intermeshed relation and in overlying relation to the perimeter surface of said cylindrical member, and a member of paramagnetic material disposed substantially parallel to the opposite end face of said cylindrical member connecting said plurality of second pole shoes to said rotor shaft.

No references cited.

ORIS L. RADER, *Primary Examiner.*

MILTON O. HIRSHFIELD, *Examiner.*

G. SIMMONS, *Assistant Examiner.*